July 11, 1967

C. C. SIMMONS 3,330,421

OUTRIGGER SUPPORT

Filed Dec. 13, 1965

INVENTOR.
Clair C. Simmons
BY
William S. Dorman
ATTORNEY

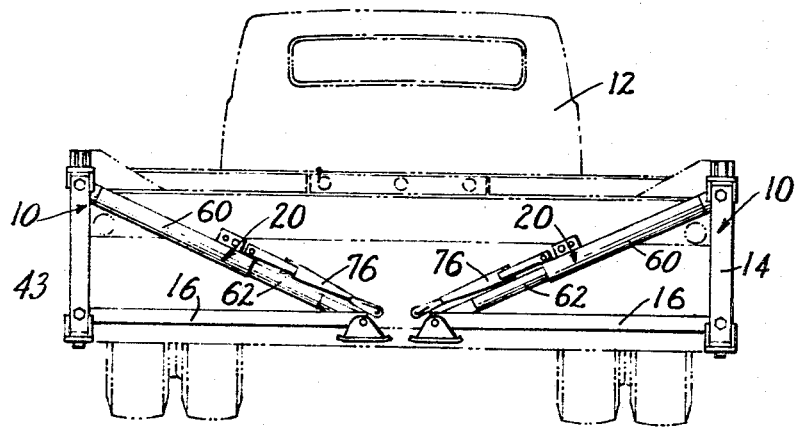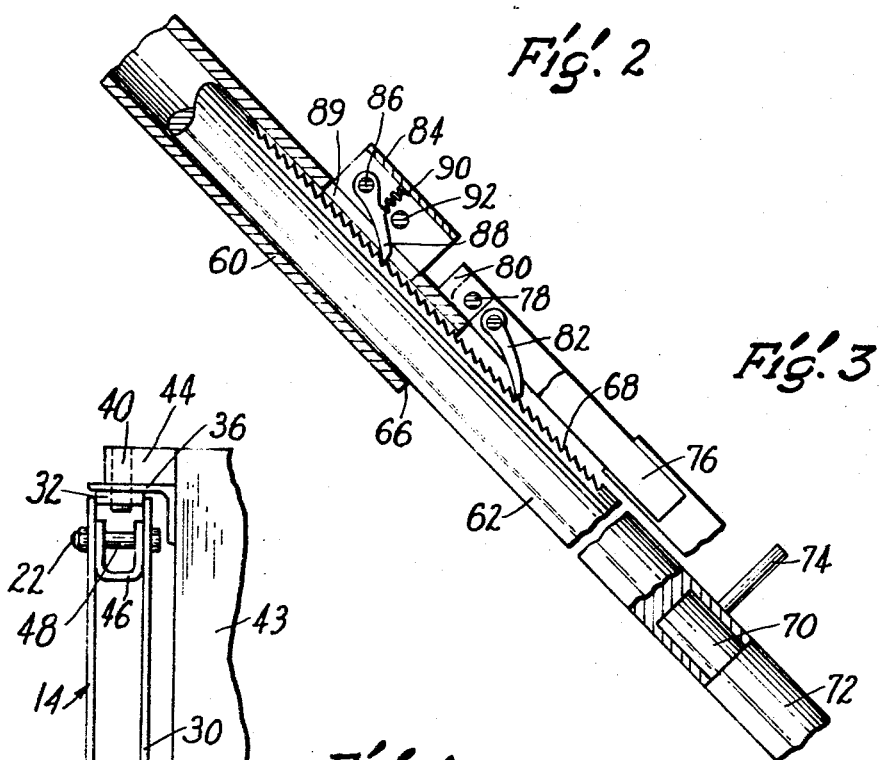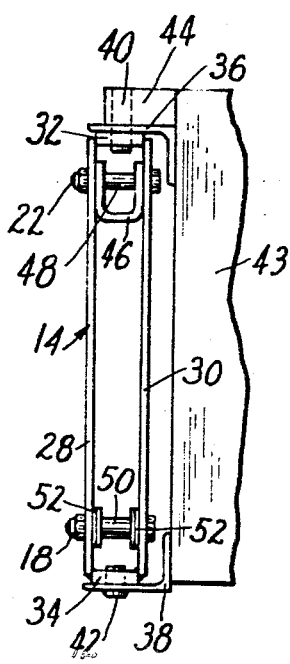

United States Patent Office 3,330,421
Patented July 11, 1967

3,330,421
OUTRIGGER SUPPORT
Clair C. Simmons, Tulsa, Okla., assignor to Auto Crane Company, Tulsa, Okla., a corporation of Oklahoma
Filed Dec. 13, 1965, Ser. No. 513,411
2 Claims. (Cl. 212—145)

ABSTRACT OF THE DISCLOSURE

A vehicle outrigger support of a generally triangular configuration with two legs pivotally secured to the vehicle, one of said legs being adjustable for providing adjustment of the overall length of reach or extension for the support structure. The adjustable leg may be locked in the selected position. The support structure is also pivotally secured to the vehicle to permit positioning of the support against the vehicle during transit.

---

This invention relates to improvements in support structures and more particularly, but not by way of limitation, to an outrigger support for utilization in combination with a vehicle having a crane, digging apparatus, or the like, mounted thereon.

Truck or vehicle mounted cranes, digging equipment, derrick structures, and the like, are in widespread use today in order to provide equipment which may be readily moved from location to location. Most of this equipment is subjected to substantially great forces or pressures during the operation thereof, and as a consequence, it is usually desirable or necessary to provide auxiliary support for stabilization of the truck or vehicle upon which the equipment is mounted. These auxiliary support devices are commonly known as outrigger supports and usually extend outwardly in opposite lateral directions from the vehicle and into engagement with the ground surface for stabilization of the vehicle. Of course, the equipment is often in use on uneven terrain and the vehicle and truck itself may be disposed at a considerable angle with respect to the horizontal at the site of operation of the equipment mounted thereon. This creates a problem in the stabilization of the vehicle in that one of the outrigger support structures may not be of a sufficient overall length for engagement with the ground surface in an extremely tilted position of the vehicle. Obviously, in such an instance the one outrigger support becomes unusable for a supporting operation, and the result is a decreased efficiency in the stabilization of the vehicle.

The present invention contemplates a novel outrigger support particularly designed and constructed for overcoming this disadvantage. The novel outrigger comprises a substantially triangular shaped overall configuration constructed in such a manner to readily permit elongation or shortening thereof as required in substantially any operational disposition of a vehicle, thus providing an efficient stabilization for the vehicle in substantially any angular position thereof. The novel outrigger is pivotally secured to the vehicle in such a manner as to be readily disposed in a stowage or out-of-the-way position adjacent the body of the vehicle, when not in use. The novel structure may be readily pivoted or swung to an outwardly extending position for engagement with the surface or the ground when stabilization or support of the vehicle is desired. The length of the extension of the outrigger support from the vehicle may be readily in accordance with the operational requirements and may be locked securely in the preselected or desired position.

It is an important object of this invention to provide a novel outrigger support structure particularly designed and constructed for substantially universal operation for stabilization of a vehicle.

In is another object of this invention to provide a novel outrigger support which may be readily disposed in a stowaged position or alternately moved to an operational position.

Another object of this invention is to provide a novel outrigger support structure wherein the overall length of extension thereof may be readily adjusted in accordance with the operational requirements thereof.

Other and further objects and advantageous features of the present invention will hereinafter more fully appear in connection with a detailed description of the drawings, in which:

FIGURE 2 is an elevational view of a pair of outrigger supports embodying the invention shown, secured on a vehicle and in a stowage position with the vehicle being depicted in dotted lines.

FIGURE 3 is an enlarged sectional elevational view of a portion of the telescopic jack member in the invention.

FIGURE 4 is an end elevational view depicting the outrigger support mounting member secured against a portion of a vehicle body.

Figure 1:
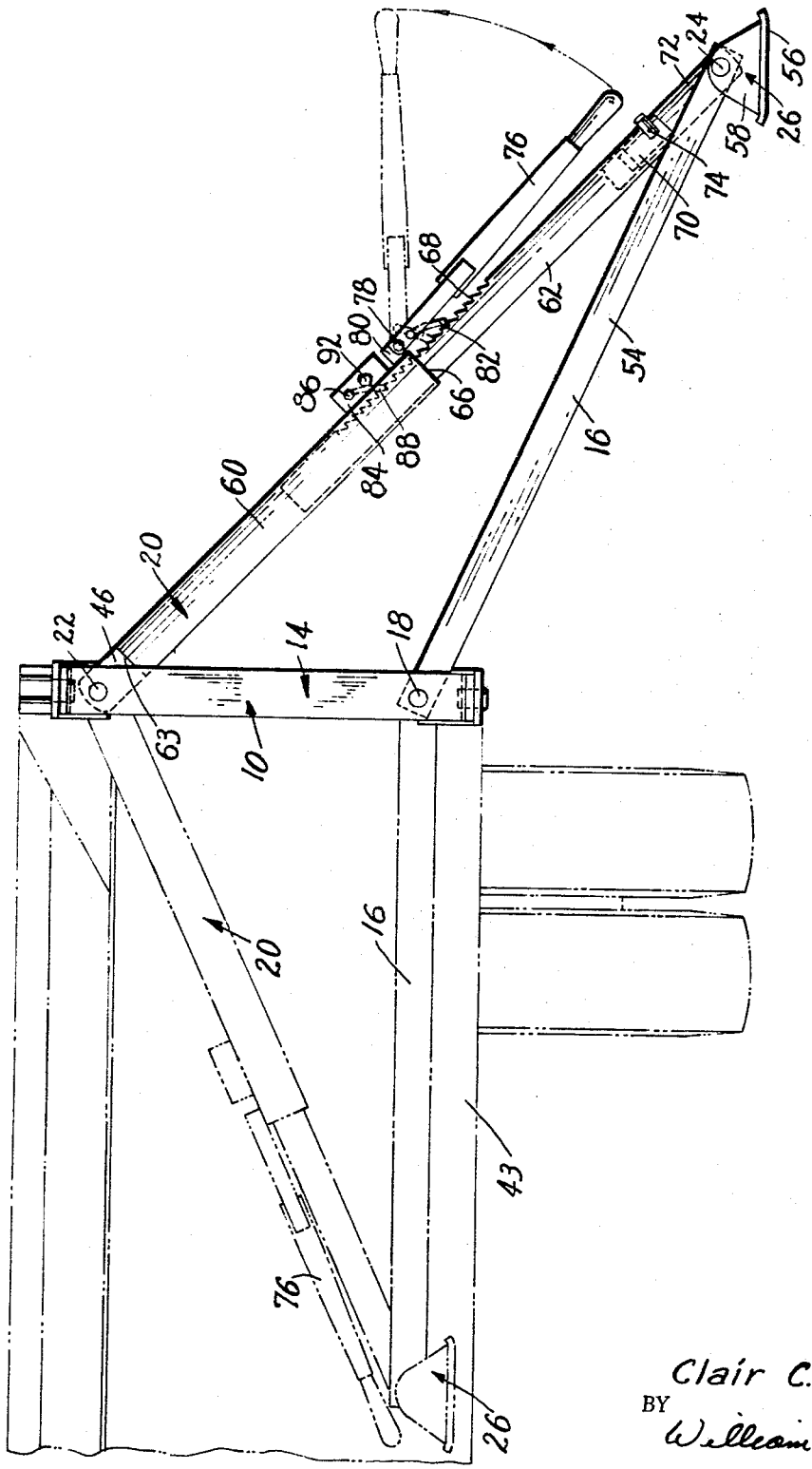
FIGURE 1 is a side elevational view of an outrigger support embodying the invention depicted in an operating position in full lines and in a stowage position against a vehicle in dotted lines.

Referring to the drawings in detail, reference character 10 generally indicates an outrigger support adapted to be pivotally secured to a vehicle 12. The outrigger 10 comprises a mounting member 14 having a tie bar 16 pivotally secured in the proximity of one end thereof as shown at 18, and a telescopic jack member 20 pivotally secured at 22 in the proximity of the opposite end thereof. The opposite or outer ends of the tie bar 16 and jack member 20 are pivotally connected at 24, thus providing a substantially triangular configuration for the outrigger 10, with each joint or connection being pivotal. A suitable foot plate 26 is also carried at the pivotal connection 24 and is adapted for engagement with the surface of the ground, or the like, when the outrigger 10 is in an operating position, as shown in solid lines in FIGURE 1.

The support member 14 as depicted herein comprises a pair of spaced strap members 28 and 30, having the opposite ends thereof rigidly connected by blocks 32 and 34. The blocks 32 and 34 are supported between an upper hinge bracket 36 and a lower hinge bracket 38 and are pivotally connected thereto by means of suitable pivot pins 40 and 42, respectively. The lower bracket 38 may be rigidly secured to the bed portion 43 of the vehicle 12 as particularly shown in FIGURE 4, and the upper hinge bracket 36 may be similarly secured to the bed 43 in spaced relationship to the lower bracket 38. In addition, it is preferable that the upper bracket 36 be secured to an outwardly extending boss member 44 provided on the bed 43. Thus, the hinge pin 40 may extend through the boss 44 as well as the support bracket 36 and block 32.

The pivot connection 22 as shown in FIGURE 4 may comprise a threaded stud extending through and between the strap members 28 and 30 for supporting a U-shaped member 46 disposed between the strap members 28 and 30. A bearing sleeve 48 may be carried by the stud and disposed between the open ends of the U-shaped member 46. The pivot connection 18 may comprise a threaded stud member extending through and between the straps 28 and 30 for supporting a bearing sleeve 50 and spacer members 52 as disposed at the opposite ends of the bearing sleeve 50.

The tie bar 16 may be constructed of any suitable material and as shown herein is preferably a channel member or a pair of spaced strap members 54 (only one of which is shown herein), spaced apart by a suitable elongated spacer member (not shown) as herein before set forth. One end of each of the straps 54 is pivotally secured at 18 and the opposite ends of the straps 54 receive one end of the jack member 20 therebetween for pivotal connection at 24. Of course, it is preferable to provide an open space (not shown) between the ends of the spaced strap members 54 for facilitating the pivotal movement at the connection points 18 and 24.

The foot plate 26 preferably comprises a base plate 56 having a pair of spaced upstanding bracket members 58 (only one of which is shown in the drawings) extending upwardly therefrom in such a manner that the straps 54 may be disposed therebetween and the foot plate 26 can be pivotally connected thereto at 24. When the outrigger 10 is in an operating position, the foot plate 26 may be easily adjusted at the pivot connection 24 for facilitating disposition of the foot plate on the ground.

The jack 20 comprises a guide tube 60 having a ratchet bar 62 telescopically engaged with respect thereto. One end 63 of the guide tube 60 is closed and is provided with or carries the axially extending tongue member 46 which is pivotally secured to the mounting member 14 at 22. The opposite end 66 of the tube 60 is open for receiving the ratchet rod 62 therein. The ratchet rod 62 is preferably of a substantially circular cross-sectional configuration and a plurality of spaced ratchet teeth 68 extend longitudinally along a portion of one side of the rod 62 for a purpose as will be hereinafter set forth. The outer end of the rod 62 is carried by a rotatable swivel connection 70 of any suitable type and which is rigidly secured to a fixed end member 72, which in turn is pivotally secured at 24 to the tie bar 16. A radially outwardly extending handle member 74 is provided on the lower or outer end of the ratchet bar 62 for facilitating rotation thereof for a purpose as will be hereinafter set forth.

A hand lever of any suitable type generally indicated at 76 is pivotally connected at 78 to a bracket member 80 provided on the outer periphery of the guide tube 60 in the proximity of the open end 66 thereof. A pawl member 82 is pivotally secured to the lever 76 and adapted for engagment with one of the ratchet teeth 68 whereby the lever 76 may be utilized in a manner similar to the usual mechanical jack action for extending the ratchet bar 62 with respect to the guide tube 60.

A housing member 84 is secured to the outer periphery of the guide tube 60 and spaced slightly from the bracket 80 for receiving a transversely extending pivot pin 86 therethrough. A second pawl member 88 is pivotally secured to the pivot pin 86 and a spring member 90 provided within the housing 84 constantly urges the pawl 88 through a slot 89 provided in the tube 60 and in a direction toward the ratchet bar 62 for engagement therewith. A removable pin 92 extends transversely through the housing and is spaced from the pivot pin 86 for engagement with the pawl 88 to retain the pawl in a locked engagement with one of the ratchet teeth 68 as will be hereinafter set forth.

It is preferable to provide at least two of the outrigger support devices 10 for the truck or vehicle 12. The outriggers may be secured to the opposite sides of the bed 43 whereby one outrigger will extend laterally from the vehicle 12 in one direction and the other outrigger 10 will extend laterally from the vehicle 12 in an opposite direction. When the vehicle 12 is in transit or the outrigger support structure 10 is not in use, the outriggers may be pivoted around the pivot pins 40 and 42 in such a manner that the structures are disposed adjacent the bed 43 of the vehicle as shown in solid lines in FIGURE 2. In this position, the ratchet bar 62 may be telescopically collapsed with respect to the guide tube 60 in order to provide a substantially horizontal position for the respective tie bar 16.

If desired, suitable latching means (not shown) may be provided on the vehicle 12 for retaining the outrigger supports in this collapsed or stowage position.

When the vehicle 12 is to be utilized for a purpose requiring the stabilization provided by the outrigger support structures, the outriggers 10 may be pivoted around the pivot pins 40 and 42 whereby each of the outriggers extends substantially laterally in opposite directions from the vehicle 12 as one of which is shown in solid lines in FIGURE 1. The ratchet bar 62 may be telescopically extended with respect to the guide tube 60 through a sufficient distance whereby the foot plate 26 rests upon the surface of the ground. Of course, the pivot connections 18, 22 and 24 cooperate for positioning the jack 20 and the tie bar 16 during the extending operation. The hand lever 76 and pawl 82 carried thereby may be utilized in a manner similar to the usual mechanical jack for extending the rachet bar 62. When the ratchet bar 62 has been positioned to the most desirable position with respect to the guide housing 60, the pin 92 may be placed in the housing 86 for securely retaining the locking pawl 88 in engagement with the most closely positioned ratchet tooth 68. This will securely lock the ratchet bar 62 in the selected extended position.

When the ratchet bar 62 is to be contracted or moved further within the guide tube 60, the pin 92 may be removed from the housing 84 for releasing the locking engagement between the pawl 88 and the ratchet tooth 68. The handle 74 may then be manually grasped for rotating the ratchet rod 62 about the longitudinal axis thereof and through an arc of approximately 90 degrees whereby the ratchet teeth 68 are moved out of engagement with either of the pawls 82 and 88. The rachet rod 62 may then be quickly moved inwardly with respect to the guide tube 60. Of course, this disengaged position between the ratchet teeth 68 and the pawls 82 and 88 also facilitates rapid extension of the bar 62 when desired.

It will be apparent that the overall working length or reach of each outrigger support 10 from the vertical is readily adjustable. In other words, vertical movement of the foot plate 26 may be obtained by extending or retracting the rachet bar 62 of each outrigger support, whereby the positioning of the foot plate is readily adjustable. Thus, each outrigger carried by the vehicle 12 may be independently adjusted for providing support from the ground surface regardless of the angle in which the vehicle itself is disposed. In addition, the outrigger support is extremely simple and efficient in operation.

From the foregoing it will be apparent that the present invention provides a novel swinging ratchet outrigger support, particularly designed and constructed for stabilization of a vehicle regardless of the angular position of the vehicle during a working operation. The outrigger may be quickly moved to a supporting position and adjusted in accordance with the desired leveling action and may be readily moved to a stowage position when not in use.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. An outrigger support comprising a plurality of leg members pivotally connected together to provide a triangular configuration, one of said leg members being telescopic for adjusting the overall length of the outrigger support, said telescopic leg member comprising a guide tube, a rod member slidably disposed within the guide tube, and jack means cooperating between the guide tube and rod member for facilitating extension and contraction of the rod member with respect to the guide tube, said jack means comprising a plurality of spaced ratchet teeth provided on a portion of the rod member, a lever pivotally secured to the guide tube, a pawl member carried by the lever for selective engagement with the ratchet teeth to effect a mechanical jack action for extension of the rod member with respect to the guide tube, and said rod member is of a substantially circular cross-sectional configuration, and swivel means is provided in the jack means for cooperation with the rod member to permit independent rotation of the rod member to disengage the ratchet teeth from the pawl member for facilitating contracting and extending of the rod member with respect to the guide tube.

2. An outrigger support comprising a plurality of leg members pivotally connected together to provide a triangular configuration, one of said leg members being telescopic for adjusting the overall length of the outrigger support, said plurality of leg members comprising a first leg member in the form of a substantially upright support member adapted for pivotal connection with a vehicle, said pivotal connection of said upright support member providing for a pivoting thereof about a substantially vertical axis, a second leg member in the form of a tie bar pivotallly secured in the proximity of one end of the support member and extending outwardly therefrom, and a third leg member in the form of jack means pivotally secured in the proximity of the opposite end of the support member and extending outwardly therefrom into pivotal connection with the outer end of the tie bar, and a foot plate pivotally carried at the connection between the jack means and the tie bar, said jack means comprising a guide tube pivotally secured to the support member, a ratchet rod slidably disposed within the guide tube, a plurality of spaced ratchet teeth provided along one side of the ratchet rod and extending longitudinally along a portion thereof, a lever pivotally secured to the guide tube, a pawl member pivotally secured to the lever and selectively engageable with the ratchet rod with respect to the guide tube, and locking pawl means carried by the guide tube for cooperating with the ratchet teeth for locking the ratchet rod in the selected position with respect to the guide tube, and swivel means is provided in the jack means for independent rotation of the ratchet rod about the longitudinal axis thereof for moving the ratchet teeth out of engagement with the pawl members to facilitate rapid extension and contraction of the ratchet rod with respect to the guide tube.

References Cited
UNITED STATES PATENTS 2,135,080    11/1938    Johnston _____ 212—145
2,436,799    3/1948    Frost _____ 212—145

EVON C. BLUNK, *Primary Examiner.*

H. C. HORNSBY, *Assistant Examiner.*